United States Patent [19]

Clements et al.

[11] 4,245,513
[45] Jan. 20, 1981

[54] VARIABLE AREA METER INSERT UNIT

[75] Inventors: Thomas W. Clements, Ambler; E. Craig Waters, Lansdale, both of Pa.

[73] Assignee: Will Ross, Inc., Milwaukee, Wis.

[21] Appl. No.: 9,039

[22] Filed: Feb. 5, 1979

Related U.S. Application Data

[63] Continuation of Ser. No. 841,518, Oct. 12, 1977, abandoned.

[51] Int. Cl.³ .............................................. G01F 1/22
[52] U.S. Cl. ................................................. 73/861.55
[58] Field of Search ................. 73/209, 323, 326, 327, 73/328, 272 R

[56] References Cited

U.S. PATENT DOCUMENTS

| | | | |
|---|---|---|---|
| 845,085 | 2/1907 | Hicks | 73/328 |
| 1,264,785 | 4/1918 | Gibbs et al. | 73/326 |
| 2,311,181 | 2/1943 | Bowen | 73/209 |
| 2,370,634 | 3/1945 | Brewer | 73/209 |
| 3,060,739 | 10/1962 | Stenberg | 73/209 |
| 3,154,945 | 11/1964 | Busillo | 73/209 |
| 4,050,305 | 9/1977 | Evans et al. | 73/209 |

*Primary Examiner*—Herbert Goldstein
*Attorney, Agent, or Firm*—John A. Dhuey

[57] ABSTRACT

A variable area meter unit is described which is self-contained to provide a meter tube in an enclosure and facilitate insertion and location of the tube in a standard support frame. The enclosure can be manufactured with a viewing face consisting of a lens to improve readability through single axis magnification. Additionally, a high pressure release panel can form another side of the enclosure to direct any blow-outs in a preferred direction.

16 Claims, 7 Drawing Figures

U.S. Patent      Jan. 20, 1981      4,245,513
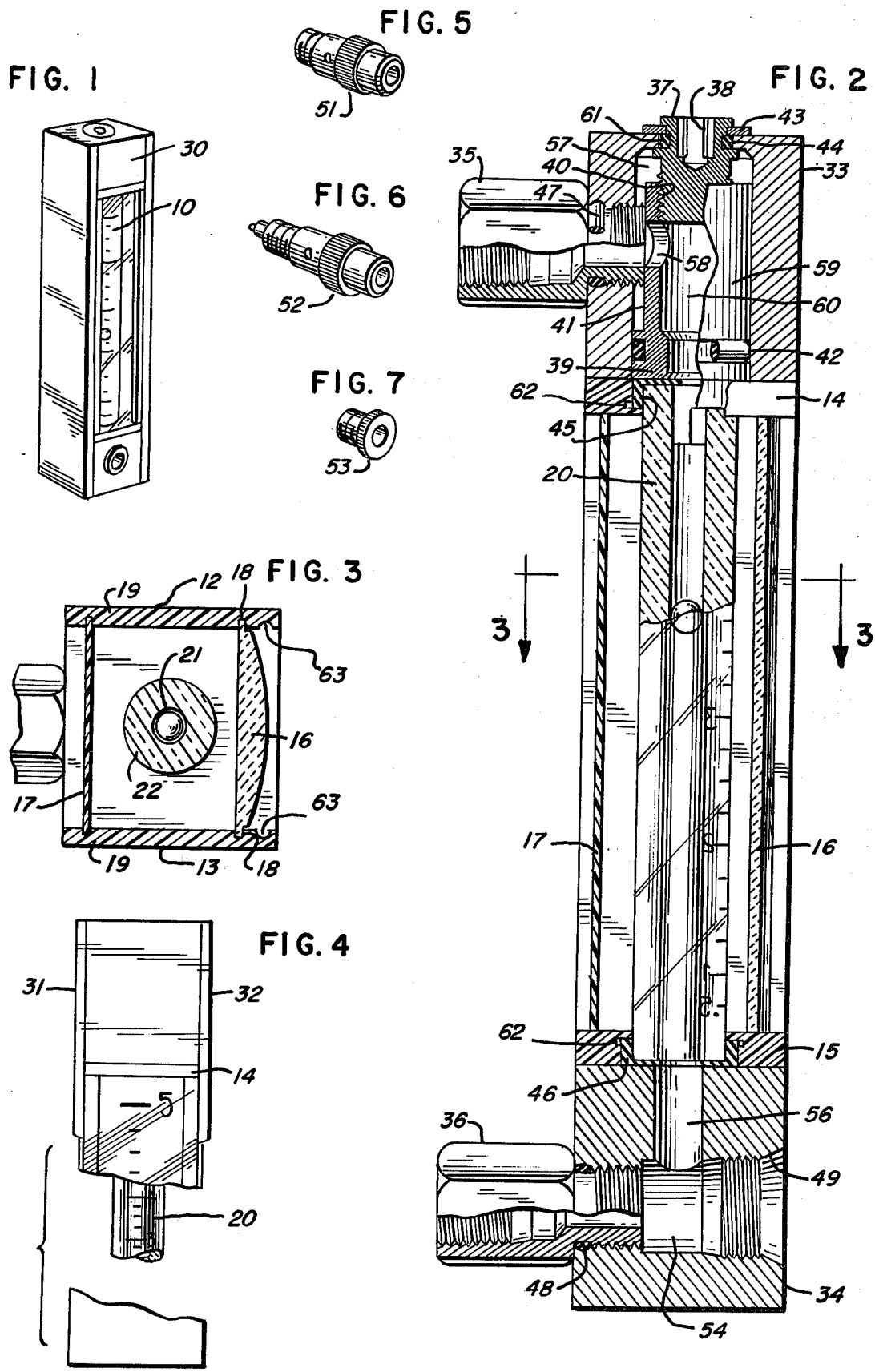

VARIABLE AREA METER INSERT UNIT

This is a continuation of application Ser. No. 841,518, filed Oct. 12, 1977, now abandoned.

The invention is concerned generally with variable area meters useful in the measurement of fluid flow. More particularly, it is concerned with a variable area meter unit comprising an enclosure and a meter tube which can be inserted into a support frame.

Conventional variable area meters typically consist of a rectangular, metal framework having top and bottom housings to receive inlet and outlet fittings from the fluid flow line. The housing also contains the sealing means to incorporate the meter tube into the flow system. Generally, the sealing means consists of a gasket encompassing the tube near each end and a seal spindle in the top housing which rotates to compress the gasket about the meter tube. The top and bottom housing generally are connected by two metal panels on opposed sides. A front, clear cover and a back, opaque cover are provided between the sides.

Because of space requirements in most process operations wherein variable area meters are utilized, the sides of the framework often are close to the meter tube. Thus, it is difficult to insert and remove the tube from the framework. A common method is to place a small segment of paper about the tube grasp the two free ends of the paper so that the tube will be held by the paper, insert the tube and paper into the framework, center the tube, rotate the sealing spindle to seat the seals while supporting the tube in a centered, upright configuration, removing the paper and finally attaching the front cover to the framework.

Several serious problems are apparent from that procedure. Firstly, it is very difficult to insert the meter tube within the narrow framework using the fingers alone and the use of the paper greatly increases the chances of tube slippage and breakage. Secondly, it is difficult to center the tube and retain it in an upright position while the sealing spindle is being tightened. Furthermore, conventional sealing spindles cause the tube itself to rotate. That rotation usually is not constant between different tubes and frameworks, and estimates of an initial tube rotational position are necessary to end with the indicia on the tube facing in the forward direction where it can be read by an operator. Failure to center the tube can result in chipping of the tube if metal to glass contact is made.

Other disadvantages are present in conventional units. The flat surface effect of the clear, front panel generally distorts the float image as seen through the front cover, and accurate reading of the indicated flow rate is difficult. A particular fault of conventional units is their inability to control glass fragments from the tube if the tube explodes. Fragments are just as likely to exit from the front of the rotameter as from the back, thus increasing the chances of injury to an operator. Flowmeter tubes are rated at 250 pounds per square inch generally and current standards require them to withstand 1½ times rated pressure. No economical method has heretofor been developed for controlling explosions at or higher than the standard pressures in rotameters which are to have general applications in the process industries.

The difficiencies present in current variable area meters are corrected by the compact, self-contained insert unit of the present invention, which is illustrated by the following drawings in which:

FIG. 1 is an overall view of the insert unit located within the support framework;

FIG. 2 is a cross-sectional view of the insert unit and framework;

FIG. 3 is a cross-sectional view along line 3—3 of FIG. 2;

FIG. 4 is a partial front view of the unit illustrating the magnification created by the lens portion of the insert unit;

FIGS. 5 and 6 illustrate valves which can be combined with the meter unit; and

FIG. 7 illustrates a closure plug which is used on the meter unit when no valve is used.

The insert unit 10 of this invention is adapted to fit with a generally conventional variable area meter framework 30. Framework 30 is fabricated with conventional side members 31 and 32 connecting top housing 33 and bottom housing 34. Bottom housing 34 threadably receives fluid inlet fitting 36, which is sealed to the housing by seal 48. Likewise top housing 33 threadably receives fluid outlet fitting 35, which is sealed to the housing by seal 47. Typically, seals 47 and 48 are O-ring seals. Bottom housing 34 preferably is formed with a second threaded opening 49, which is adapted to receive valves 51 and 52 or closure plug 53. Inlet fitting 36 is in fluid communication with bores 54 and 56 in bottom housing 34. Bore 56 extends vertically from horizontal bore 54 to provide communication with the bore of rotameter flow tube 20 at its bottom end.

Top housing 33 is formed with a bore 57 for receiving sealing spindle 59. Spindle 59 is threaded at the upper portion 40 of bore 60, which extends through spindle 59. Upper portion 40 threadably engages screw member 37. Member 37 is adapted to be rotated by external means and preferably has hexagonal driving means 38. Retaining washer 43 supports screw member 37. Sealing means 61, preferably an O-ring, is retained between housing 33 and member 37 to prevent any leaking of the flowing fluid.

Seal spindle 59 is provided with a flat portion 41 extending along a substantial portion of its length. Flat 41 is contacted by the end of fluid outlet fitting 35. The impingement of fitting 35 on flat 41 prevents spindle 59 from rotating when screw member 37 is rotated. The rotational motion of screw member 37 is translated into the axial movement of spindle 59. Sealing means 42 establishes a seal between the lower portion of spindle 59 and housing 33.

Insert unit 10 is adapted to be inserted in framework 30 within the space defined by end housings 33 and 34 and side members 31 and 32. Insert unit 10 is comprised of side support panels 12 and 13 and end panels 14 and 15. End panels 14 and 15 are joined to panels 12 and 13 at the ends thereof and support meter tube 20 at a central location by means of a hole 21 which receives tube 20. A recessed portion 22 is formed in each end panel 14 and 15 to receive sealing washers 45 and 46 respectively. Recesses portion 22 also creates a resilient lip surrounding hole 21 in each of the end panels 14 and 15 for facile insertion of tube 20 into end panel 14. Hole 21 is fixed to provide a friction fit with tube 20. The resilient lip functions to grip tube 20 at a fixed position so that tube 20 will not slip from hole 21 and also to centrally locate tube 20 within insert unit 10. Side panels 12 and 13 are formed with grooves 63 at the forward edges thereof to facilitate removal of insert unit 10 from framework 30.

A clear, front viewing panel is interposed between side panels 12 and 13. Slots 18 are found in sides 12 and 13 to receive panel 16. In a preferred embodiment panel 16 is convex lens to provide a magnifying effect to assist in reading of the indicia on tube 20.

Back panel 17 is interposed between side panels 12 and 13 and is retained within slots 19. Back panel 17 is formed from material substantially thinner than side panels 12 and 13, front panel 16 and end panels 14 and 15, and is adapted to release from slots 19 under a differential pressure which is on the order of several inches of water. Consequently, if pressure in the fluid system causes tube 20 to explode, the excess pressure in unit 10 will cause panel 17 to move outwardly and release the then present forces and glass from the back of the rotameter. The explosion created by any tube failure thus is controlled in a particular direction which can be chosen to minimize the danger of injury. The particular described embodiment is advantageous in the process industries where rotameters are conventionally panel mounted. In those installations, it is apparent that the full force of the explosion will be directed in back of the panel, thus minimizing the chance of injury to operators and other personnel who may be observing in front of the mounting panel.

When insert unit 10 is located within framework 30, tube 20 automatically is centered over bore 56 in housing 34 and under sealing spindle 59 and bore 60. Sealing washers 45 and 46 provide a seal between tube 20 and framework 30. In a preferred embodiment sealing washers 45 and 46 are formed with an L-shaped transverse cross section so that they function both to seal the tube and hold it in insert 10.

It is preferable to dimension insert 10 so that it fits flush within framework 30. Tube 20 then is centered appropriately in framework 30 in a simple operation. Then sealing spindle 50 is moved downwardly by rotating screw member 37 to force sealing washers 45 and 46 against the top and bottom of tube 20, respectively. As stated hereinbefore, flat 41 prevents spindle 59 from rotating and tube 20 remains in its insertion position. Accordingly, it is no longer necessary to estimate an initial insertion position for the tube 20 which hopefully would end with front-facing indicia when the seal was completed.

It is apparent that one insert unit can be used with a multitude of tubes with different inside diameters. Also, different shapes for the insert unit could be provided depending on the shape of the framework into which it is to be inserted.

In another embodiment of the invention, insert 10 can be adapted to form a sealed structure about tube 20. Insert 10 can be filled with dry nitrogen or other inert gas to prevent condensation and/or frost from forming on the surface of tube 20, which might impair or even prevent accurate flow readings. Also, it is desired to form bottom panel 15 with a small groove in front of the front panel. That groove facilitates removal of insert 10 when operations have been concluded either by means of a finger or thumb nail or an appropriately shaped instrument, which can be inserted into the groove and pulled outwardly.

The invention has been illustrated with reference to the drawings but it will be apparent to those skilled in the art that modifications can be made without departing from the spirit or scope of this invention.

What is claimed is:
1. A variable area meter unit comprising
 a framework having a top housing and a bottom housing connected by a first pair of side panels;
 a tube insert unit adapted for insertion between said top and bottom housing and said first pair of side panels;
 said top housing having a first vertical bore extending substantially its length and a first horizontal bore communicating with said first vertical bore and adapted to connect to a fluid flow line;
 a sealing spindle slideably moveable with said first vertical bore, said sealing spindle having a second horizontal bore communicating with said first horizontal bore and a second vertical bore extending its entire length and communicating with said second horizontal bore, and said sealing spindle having a flat portion surrounding the opening of said second horizontal bore;
 means for translationally moving said sealing spindle within said first vertical bore;
 first sealing means between said sealing spindle and said tube insert; and
 second sealing means between said bottom housing and said tube insert, said bottom housing having a second vertical bore and a third horizontal bore communicating with said second vertical bore.

2. A variable area meter insert unit for insertion into a variable area flow meter frame having a pair of opposed side walls and a top and bottom housing with means for engaging a flow meter tube, the inner surfaces of said side walls and said top and bottom housings defining a partially enclosed first volume therebetween, said insert unit comprising:
 a pair of side panels; and
 a pair of end panels joined to said side panels to provide a unitary structure, each of said end panels having an opening therethrough for receiving a flow meter tube, the outer surfaces of said side panels and said end panels defining a partially enclosed second volume which is coextensive with said first volume, whereby said insert unit is flush with said meter frame when said insert unit is inserted into said flow meter frame, said openings in said end panels being positioned to axially align said flow meter tube with said means in said top and bottom housing for engaging said flow meter tube when said insert unit is flush with said flow meter frame.

3. A variable area meter insert unit as in claim 2 further comprising a front viewing panel attached between said side panels.

4. A variable area meter insert unit as in claim 3 further comprising a back panel between said side panels.

5. A variable area meter insert unit as in claim 4 wherein said back panel has a thickness substantially less than said side panels and said viewing panel.

6. An insert unit as in claim 5 wherein each of said end panels has a recessed portion surrounding said opening for receiving a sealing washer.

7. An insert as in claim 4 wherein said side panels have a longitudinal groove at their rearward edge for receiving said back panel.

8. An insert unit as in claim 4 wherein said side panels have a longitudinal groove at their forward edge for receiving said viewing panel.

9. An insert unit as in claim 3 wherein said veiwing panel is a magnifying lens.

10. A variable area meter insert unit as in claim 2 wherein said opening is formed with a resilient lip for frictionally engaging a flow meter tube.

11. A variable area meter insert unit for insertion into a variable area flow meter frame having a pair of opposed side walls and a top and bottom housing with means for engaging and establishing fluid communication with a flow meter tube, the inner surfaces of said side walls and said top and bottom housings defining a partially enclosed first volume therebetween, said insert unit comprising:

side panel support means;

tube support means attached at the ends of each of said side panel support means for receiving a flow meter tube, the outer surfaces of said side panel support means and said tube support means defining a partially enclosed second volume which is coextensive with said first volume whereby said insert unit is flush with said meter frame when said insert unit is inserted into said flow meter frame, means on said tube support means for positioning a flow meter tube in fluid communication with said top and bottom housings;

pressure relief means associated with said support means for releasing pressure in a predetermined direction; and viewing means between said side panel support means.

12. A variable area meter insert unit for insertion into a variable area flow meter frame having a pair of opposed side walls and a top and bottom housing with means for engaging a flow meter tube, the inner surfaces of said side walls and said top and bottom housings defining a partially enclosed first volume therebetween, said insert unit comprising:

a pair of side panels; and a pair of end panels joined to said side panels to provide a unitary structure, each of said end panels having an opening therethrough for receiving a flow meter tube, the outer surfaces of said side panels and said end panels defining a partially enclosed second volume which is substantially coextensive with said first volume, whereby said insert unit is flush with at least one edge of said meter frame when said insert unit is inserted into said flow meter frame, said openings in said end panels being positioned to axially align said flow meter tube with said means in said top and bottom housing for engaging said flow meter tube when said insert unit is flush with at least one edge of said meter frame.

13. A variable area meter insert unit for insertion into a variable area meter frame having a pair of opposed side walls and a top and bottom housing with means for engaging a flow meter tube, the inner surfaces of said side walls and said top and bottom housings defining a partially enclosed first volume therebetween, said insert unit comprising:

a pair of side panels;

a pair of end panels jointed to said side panels to provide a unitary structure, each of said end panels having an opening therethrough for receiving a flow meter tube, the outer surfaces of said side panels and said end panels defining a partially enclosed second volume which is substantially coextensive with said first volume; and means on said insert unit and said meter frame to axially align said openings in said end panels with said means in said top and bottom housing for engaging said flow meter tube when said insert unit is placed within said meter frame.

14. An insert unit as in claim 13 wherein said alignment means comprises meter frame side walls and insert unit end panels dimensioned to align said openings with said means in said top and bottom housing for engaging said flow meter tube when at least one edge of said end panels is flush with at least one edge of said side walls.

15. An insert unit as in claim 13 wherein said alignment means comprises meter frame side walls and insert unit side panels dimensioned to align said openings with said means in said top and bottom housing for engaging said flow meter tube when at least one edge of said side panels is flush with at least one edge of said side walls.

16. An insert unit as in claim 13 wherein said alignment means comprises insert unit end panels and meter housings dimensioned to align said openings with said means in said top and bottom housing for engaging said flow meter tube when at least one edge of said end panels is flush with at least one edge of said housings.

* * * * *